United States Patent [19]
Cowley et al.

[11] Patent Number: 5,851,374
[45] Date of Patent: Dec. 22, 1998

[54] PROCESS FOR PRODUCTION OF CHLORINE DIOXIDE

[75] Inventors: Gerald Cowley, Mississauga; Marek Lipsztajn, Etobicoke, both of Canada

[73] Assignee: Sterling Canada, Inc., Houston, Tex.

[21] Appl. No.: 781,045

[22] Filed: Jan. 9, 1997

[51] Int. Cl.⁶ ...................................................... C01B 11/02

[52] U.S. Cl. ........................... 205/471; 423/478; 205/556

[58] Field of Search ............................ 423/478; 205/471, 205/556

[56] References Cited

U.S. PATENT DOCUMENTS

| | | | |
|---|---|---|---|
| 3,884,777 | 5/1975 | Harke et al. | 205/517 |
| 4,533,691 | 8/1985 | Khalil et al. | 524/401 |
| 4,574,084 | 3/1986 | Berger | 424/128 |

*Primary Examiner*—Arun S. Phasge
*Attorney, Agent, or Firm*—Sim & McBurney

[57] ABSTRACT

Chlorine dioxide is produced by reaction of chlorate ions, usually provided by sodium chlorate, with a persulfate in an aqueous acid reaction medium containing sulfuric acid. By-product sodium sulfate, sulfuric acid feedstock or mixture may be electrolyzed to form the persulfate for the reaction.

24 Claims, No Drawings

PROCESS FOR PRODUCTION OF CHLORINE DIOXIDE

FIELD OF THE INVENTION

The present invention is concerned with the production of a high purity chlorine dioxide from chlorate ions using persulfate ion as a reducing agent and, in particular, with the production of chlorine dioxide where the persulfate ions are generated electrochemically from at least one of the by-products of the chlorine dioxide generation process, e.g. sodium sulfate or sodium sesquisulfate, or from the sulfuric acid feedstock to the chlorine dioxide generation process, or from mixtures thereof.

BACKGROUND TO THE INVENTION

It is known to produce chlorine dioxide, a chemical used in the bleaching of wood pulp in pulp mills, by reduction of an acid aqueous chlorate solution using various reducing agents, such as methanol, chloride ions, sulfur dioxide and hydrogen peroxide. In all these processes separate feeds of chlorate ions, sulfuric acid and the reducing agent are required. Since chlorate ions are typically supplied as sodium chlorate, these processes result in the co-production of various sodium sulfate salts (sometimes referred to as "saltcake") which can find only a partial utilization in the pulp mill environment. In order to utilize the excess saltcake, it was proposed in the past to electrochemically split such excess saltcake into sodium hydroxide and sulfuric acid. Unfortunately, only a very dilute sulfuric acid can be regenerated from saltcake using this method and, as such, the dilute sulfuric acid cannot be directly used in the chlorine dioxide generation process without negatively affecting the water balance in the chlorine dioxide generator.

It has previously been suggested in U.S. Pat. No. 2,335,808 (Soule) that chlorine dioxide may be produced by reacting a metal chlorate with sulfuric acid in the presence of a persulfate, notably persulfuric acid. The effectiveness of such process carried out at low temperatures (less than 50° C.), atmospheric pressure and under non-crystallizing conditions is questionable, as indicated in U.S. Pat. No. 2,335,808, col. 1, lines 45 to 46, where the inventor indicates that he does not know whether or not persulfuric acid is the effective reducing agent. Further, this prior art does not describe how to modify the process in order to improve the water balance as well as the economics of the overall system.

There is, therefore, a need for an improved chlorine dioxide generating process in which at least one of the by-product sodium sulfate, the sulfuric acid feedstock or the combination thereof is converted at least partially into a chemical which can be fed directly into the chlorine dioxide generator without having any negative effect on the generator performance. Furthermore, since the cost of the reducing agent, such as hydrogen peroxide, or, to a lesser extent, methanol, constitutes a significant component of the overall manufacturing cost of chlorine dioxide, it is beneficial to convert sulfate ions present in either the saltcake by-product or sulfuric acid or combinations thereof into a chemical which can serve as a reducing agent in the chlorine dioxide generation process.

Finally, it is highly desirable to produce a high purity chlorine dioxide with little or no chlorine by-product, at commercially-acceptable production rates while co-generating no organic contaminants and employing a novel reducing agent originating from at least one of saltcake by-product, sulfuric acid feedstock or a combination thereof.

SUMMARY OF INVENTION

It has now been surprisingly found that the product mixture resulting from the electrochemical oxidation of at least one of saltcake by-product, sulfuric acid feedstock or the combination thereof can react with chlorate ions in the absence of any additional reducing agent to produce a highly pure chlorine dioxide with a very good efficiency and at commercially acceptable production rates.

Accordingly, in one aspect, the present invention provides a method of producing chlorine dioxide, which comprises reacting chlorate ions, particularly sodium chlorate, with a persulfate in an aqueous acid reaction medium containing sulfuric acid at a temperature of at least about 50° C. and below the temperature at which chlorine dioxide undergoes spontaneous decomposition.

In the invention, the persulfate may be formed by electrolysis of an aqueous solution of alkali metal sulfate originating from the chlorine dioxide generating process, sulfuric acid feedstock for the chlorine dioxide generating process or a mixture of such materials. Alternatively, the persulfate may be provided from a source external to the chlorine dioxide generating system.

GENERAL DESCRIPTION OF INVENTION

A key feature of the present invention is the electrochemical formation of persulfate for the chlorine dioxide generating process from by-product alkali metal sulfate from the process, sulfuric acid feedstock or combinations thereof. In the electrochemical oxidation process, it is preferred to employ a divided electrochemical cell equipped with an anode, which may be characterized by a high overpotential towards the oxygen evolution reaction, such as bright platinum. Alternative anode materials include, for example, lead dioxide, glassy carbon and platinized titanium. The cathode may be constructed from any material compatible with the hydrogen evolution reaction, such as graphite, lead and steel, including super alloy stainless steel. As separators in the cell, a wide variety of membrane materials, preferably cation exchange membrane, or diaphragms may be employed. It is also possible to employ undivided electrolyzers with cathodes covered by an oxide layer to prevent the reduction of the products formed at the anode.

In order to improve the current efficiency in the electrolytic process, it is beneficial to employ additives known as oxygen evolution suppressants, for example, thiocyanates, fluorides, fluorosilicates and aminoacetic acid. Current efficiency may also be improved by employing lower temperatures and higher current densities.

In one embodiment of the invention, at least a part of the sulfuric acid feed is subjected to electrochemical oxidation and the resulting mixture of sulfuric acid and persulfuric acid is fed directly to the chlorine dioxide generator containing the aqueous acid reaction medium. The persulfuric acid can be in the form of either peroxydisulfuric acid, $H_2S_2O_8$ or monoperoxysulfuric acid, $H_2SO_5$, known also as Caro's acid. The latter acid is believed to be the less stable form of the peroxysulfuric acid. The conversion in the electrochemical cells can be controlled, for example, by employing a cascade of electrochemical cells, to achieve the desired ratio of sulfuric acid and persulfuric acid to match the requirements of the chlorine dioxide generating process. The chlorine dioxide generating reactions believed to be taking place in the chlorine dioxide generator are:

$$2NaClO_3 + H_2SO_5 \rightarrow 2ClO_2 + O_2 + Na_2SO_4 + H_2O \quad (1)$$

and $$2NaClO_3 + H_2S_2O_8 \rightarrow 2ClO_2 + O_2 + Na_2SO_4 + H_2SO_4 \quad (2)$$

for the Caro's acid and peroxydisulfuric acid, respectively, and where the alkali metal chlorate is sodium chlorate. An additional benefit of such approach is the minimization of the water input into the generator as compared to the conventional approach involving separate feeds of acid and reducing agent.

In another embodiment of the invention at least a part of the saltcake by-product from the chlorine dioxide generator is mixed with the sulfuric acid feed and the resulting mixture containing high concentration of sodium bisulfate and a desired level of sulfuric acid is subjected to electrolysis. In the electrolysis process, it is highly desirable to enable sodium ions to migrate to the cathode compartment where they form sodium hydroxide with the hydroxyl ions generated at the cathode. The actual fraction of sodium ions being transferred to the cathode compartment is dependent primarily on the ratio of sodium ions to hydrogen ions present in the anode compartment. Sodium hydroxide formed in the cathode compartment is readily utilized in the pulp mill environment. The proportion of saltcake by-product added to the sulfuric acid prior to electrolysis is dependent on other possible uses of saltcake in the pulp mill, such as, sodium and sulfur losses make-up. Typically, about half of the saltcake co-produced in the chlorine dioxide generator can be utilized in this particular application.

In yet another embodiment of the present invention, at least a part of the saltcake co-produced in the chlorine dioxide generation step is subjected to electrochemical oxidation without being admixed with the sulfuric acid. By combining reaction (1) with the electrolytic step (3):

$$Na_2SO_4 + 3H_2O \rightarrow H_2SO_5 + 2NaOH + H_2 \quad (3)$$

the overall chlorine dioxide generating process can be depicted as follows:

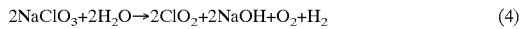

$$2NaClO_3 + 2H_2O \rightarrow 2ClO_2 + 2NaOH + O_2 + H_2 \quad (4)$$

Reaction (3) can be modified to depict the possibility of producing peroxydisulfuric acid.

It can be concluded from the above described reaction (4) that such a chlorine dioxide generating process does not require any additional sulfuric acid or reducing agent feeds. According to the present invention, both of these values can be recovered by electrolytic processing of sodium sulfate by-product. The latter embodiment offers an efficient chlorine dioxide generating process in which:

a) No acid feed is required b) No reducing agent feed is required c) Sodium hydroxide useful in the pulp mill is co-produced d) No organic by-product are formed (i.e. no BOD, COD, VOC).

All three above-described embodiments of the invention may involve a wide range of operating conditions in both the chlorine dioxide generator and the electrochemical cell. For example, the total acid normality of the aqueous acid reaction medium in the chlorine dioxide generator may vary from about 2 to about 11N. Depending on the acidity of the reaction medium, various forms of a saltcake may be precipitated. In general, in the acidity range of up to about 4.8N the prevailing form of precipitate is a neutral sodium sulfate, $Na_2SO_4$, which is anhydrous at temperatures above about 30° C., while at higher acidities, saltcake precipitates mainly as sodium sesquisulfate, $Na_3H(SO_4)_2$. The specific acidity at which the form of saltcake precipitating from the reaction medium changes from a less acidic ($Na_2SO_4$) to more acidic ($Na_3H(SO_4)_2$) is dependent on many factors, such as temperature and chlorate ion concentration. In general, higher temperatures shift this point to higher acidity values, especially at low chlorate concentrations.

Chlorate ion concentration in the aqueous reaction medium in the chlorine dioxide generator is related to the acidity level. Chlorine dioxide generation processes carried out at higher acidities typically require lower chlorate concentration levels. For example, at a relatively high acidity of about 9N, the chlorate concentration level as low as only a few grams per liter may be sufficient to achieve high efficiency of chlorine dioxide generation at a commercially acceptable production rates. On the other hand, a lower acidity process, carried out at an acidity of about 4N, may require chlorate concentration in the range of about 2 to about 4 moles per liter to achieve a high efficiency of chlorine dioxide production at commercially acceptable production rates.

The actual chlorate ion concentration also is dependent on other factors, for example, on the sulfate ion concentration in the aqueous acid reaction medium in the chlorine dioxide generator. In a crystallizing-type chlorine dioxide generation operation wherein the aqueous acid reaction medium is maintained at its boiling point at temperatures of about 50° to about 100° C., but below the temperature of spontaneous decomposition of chlorine dioxide, under subatmospheric pressures of about 90 to about 400 mmHg and by-product sodium sulfate is precipitated from the reaction medium in the generator, the chlorate ion concentration may be higher than that employed in the non-crystallizing type chlorine dioxide generation operation in which the sulfate concentration does not reach saturation limit. In fact, in the chlorine dioxide generation operation involving the non-crystallizing type generator, preferably operating in a cascade mode, comprising a primary and secondary reactor, the sulfuric acid effluent from the secondary reactor may contain as little as 1 gram per liter of chlorate or less and hence such sulfuric acid may be converted directly to persulfuric acid in the electrochemical step without incurring any significant losses of chlorate values. Chlorate ions present in higher concentrations in such effluent will likely undergo electrooxidation to perchlorate ions which is undesirable. Even in the crystallizing type chlorine dioxide generator operating at high acidity, it may be possible to send at least a part of the highly acidic reaction medium with a very low chlorate content to the electrochemical cell for electrooxidation.

The non-crystallizing atmospheric pressure type generator is operated at temperatures exceeding about 50° C. Effluent from a non-crystallizing type generator may also be sent, if desired, to a subatmospheric type crystallizing generator.

The integration of the chlorine dioxide generation operation and the electrochemical oxidation in the electrochemical cell may require optimization based on the efficiencies, operating cost and the capital cost in both unit operations. For example, the efficiency in the electrochemical oxidation process is dependent on the acidity and sulfate/bisulfate concentration in the anolyte. Peroxydisulfuric acid production is most efficient at a sulfuric acid content in the range of about 500 to 600 grams per liter and the current efficiency can be improved by increasing the concentration of sulfate/bisulfate ions. A drop in current efficiency may be observed in the course of electrolysis due to the decrease of sulfate/bisulfate ion concentration accompanied by an increase in the persulfuric acid concentration. Typically, the lower the conversion to persulfuric acid in the cell, the higher the current efficiency. It is possible to replenish the sulfate/bisulfate values in the course of electrolysis by adding saltcake by-product from the chlorine dioxide generator to the anolyte during the electrolysis.

As indicated earlier, the partial removal of sodium ions from the anolyte to form sodium hydroxide in the cathode compartment is related to the ratio of hydrogen ions to sodium ions in the anolyte. Hence, operating the electrochemical cell with a highly acidic anolyte, containing about 500 to 600 grams per liter sulfuric acid, may not permit significant removal of sodium ions. If it is desired to remove significant quantities of sodium ions, a three-compartment cell equipped with two separators, preferably cation exchange membranes, may be employed. In such a case, the highly acidic anolyte containing the desired concentration of sulfuric acid is electrolyzed in the anode compartment, while a less acidic aqueous solution of saltcake, i.e. neutral sulfate or sesquisulfate, is passed through the central compartment. Hydrogen ions from the anode compartment are transferred to the central compartment, while sodium ions are transferred from the central compartment to the cathode compartment where they form sodium hydroxide. Instead of the saltcake feed to the central compartment, an aqueous solution of sodium chlorate or its mixture with saltcake may be employed. The acidified product exiting the central compartment can be directed to the chlorine dioxide generator together with the product from the anodic compartment or may be sent to any other application. Since the current efficiency for the sodium ion transfer to the cathode compartment, i.e. the cathodic current efficiency, is dependent on the ratio of hydrogen ion to sodium ion concentration in the compartment adjacent to the cathode compartment, such an approach results in an improved cathodic current efficiency. A cascade of three-compartment cells, as described in U.S. Pat. No. 5,480,516, assigned to Sterling Pulp Chemicals Limited, and the disclosure of which is incorporated herein by reference, may be employed to further improve the current efficiency. Alternatively to the sodium hydroxide production in the cathode compartment, other cathodic reactions can be utilized, such as, electroreduction of oxygen to alkaline hydrogen peroxide, electroreduction of chlorine dioxide to chlorite, electrochemical neutralization of bisulfate ions and the cathodic reduction of chlorate ions to chlorine dioxide.

A combination of the anodic formation of persulfate ions and the cathodic formation of chlorine dioxide from chlorate ions (the latter process is described in U.S. Pat. Nos. 4,426,263, 4,767,510 and 4,798,715) leads to a very unusual result in terms of current efficiency. For example, when employing a cell equipped with a high surface area carbon type cathode most suitable for the electroreduction of chlorate ions to chlorine dioxide, as described in U.S. Pat. No. 4,767,510 and a persulfate producing anode, for example, bright platinum, the overall process may achieve close to 200% current efficiency in terms of chlorine dioxide production. This result is achieved because both the cathodic and the anodic reactions in this case result in the formation of the same product, i.e. chlorine dioxide. Chlorine dioxide in such a case is formed directly in the cathodic reaction and indirectly via the product of the anodic reaction. The same current that forms chlorine dioxide from chlorate ions at the cathode produces persulfate at the anode which then reacts with chlorate to form more chlorine dioxide. This situation is indeed very unusual and, in fact, this may be the only known electrochemical process producing the same product (chlorine dioxide in this case) from the reactant (chlorate ions) at both the cathode and the anode, thus resulting in a current efficiency exceeding 100%.

The rate of chlorine dioxide formation may be modified, if desired, by the addition of a catalyst containing an element selected from the group consisting of Pd, Mn, Ag, V, Cr, Ru, Os, Co, Ni, Sn, Pb, Fe, Cr, Mo or a combination thereof.

Chlorine dioxide generation process involving the use of persulfate ion as a reducing agent may be integrated, if desired, with other chlorine dioxide generation processes, employing other reducing agent, such as hydrogen peroxide, methanol, sulfur dioxide and other reducing agents known in the art. A combined feed of several reducing agents and/or premixing of various feedstocks may be employed. The process of the invention may also be combined with the acid sulfate metathesis process of the type described in U.S. Pat. No. 5,116,595, U.S. Pat. No. 5,399,332, both assigned to the assignee hereof and the disclosures of which are incorporated herein by reference, or similar processes.

If desired, a portion of persulfate, resulting from the electrolysis of saltcake by-product, sulfuric acid feed or the combination thereof, may be directed to another application in the pulp mill. For example, it can be used as a bleaching agent, preferably in the form of Caro's acid or peroxydisulfuric acid, with the remainder being forwarded for chlorine dioxide generation.

When a combination of at least two generators is employed for chlorine dioxide production, any excess of acid, saltcake or a combination thereof, may be sent from one generator to another. It is understood that, while it is preferred to operate the system with the persulfate originating from the electrolysis of saltcake by-product, sulfuric acid feed or a combination thereof, it is possible to employ persulfate originating from a source external to the chlorine dioxide generation system. In the pulp mill environment, there are numerous sources of sulfate ions which can be utilized in the electrosynthesis of persulfate.

Since the higher temperatures have a positive effect on the chlorine dioxide generation rate while they may have a negative effect on the current efficiency of the persulfate electrosynthesis, it may be beneficial to operate the electrochemical cell at lower temperatures than those employed in the chlorine dioxide generation reaction. A heat-exchange step may be employed, if desired, to effect such an operation.

EXAMPLE

A laboratory generator was operated continuously under subatmospheric pressure of 150 mmHg at a temperature of 73° C. The acidity of the reaction medium was set at about 8.6N (as $H_2SO_4$), while the chlorate concentration was maintained at 0.95M. The source of persulfate ions (i.e. reducing agent) was sodium persulfate originating from the electrolysis of sodium sulfate. Once the feed of persulfate to the generator started, the feed of sulfuric acid was not required to maintain desired acidity level in the generator. It was found that it is beneficial to maintain a certain steady-state concentration of persulfate ions in the generator (0.75M to 1.0M in this particular experiment, but both lower and higher concentrations may be employed). The chemical efficiency measured based on the chlorine dioxide/chlorine ratio in the gaseous product was 99%.

In a separate set of experiments it was found that the acidity and the temperature are the two main factors affecting the rate of chlorine dioxide formation. In particular, it was found that a temperature of well above 50° C. (50° C. was suggested as the upper limit in Soule U.S. Pat. No. 2,335,808) should be employed in order to achieve a high efficiency at commercially acceptable rates of chlorine dioxide production.

SUMMARY OF DISCLOSURE

In summary of this disclosure, the present invention provides a novel method of producing chlorine dioxide which involves reaction of chlorate ions, sulfuric acid and persulfate, in which persulfate is formed by electrochemical oxidation of the sulfuric acid feed to the chlorine dioxide production operation, the by-product saltcake or mixtures of the two. The procedure has benefits over the prior art. Modification are possible within the scope of this invention.

What we claim is:

1. A method of producing chlorine dioxide, which comprises:

reacting chlorate ions with a persulfate in an aqueous acid reaction medium containing sulfuric acid at a temperature of at least about 50° C. and below the temperature at which chlorine dioxide undergoes spontaneous decomposition.

2. The method of claim 1 wherein the persulfate is formed by electrolysis of an aqueous medium selected from the group consisting of an aqueous solution of alkali metal sulfate by-product from the aqueous acid reaction medium, sulfuric acid feedstock and mixtures thereof.

3. The method of claim 2 wherein said electrolysis of said aqueous medium to form persulfate is effected in a divided electrochemical cell having an anode with a high overpotential towards the oxygen evolution reaction, a cathode and at least one separator.

4. The method of claim 3 wherein said electrolysis is effected in the presence of at least one oxygen evolution suppressant.

5. The method of claim 2 wherein chlorine dioxide is electrochemically produced from chlorate ions in a cathode compartment of a divided electrochemical cell in addition to chlorine dioxide production from the aqueous acid reaction medium.

6. The method of claim 2 wherein said persulfate in said aqueous acid reaction medium is provided by subjecting at least part of a sulfuric acid feedstock for said aqueous acid reaction medium to electrochemical oxidation to form a mixture of sulfuric acid and persulfuric acid and feeding said mixture to the aqueous acid reaction medium.

7. The method of claim 6 wherein said persulfuric acid is in a form selected from the group consisting of peroxydisulfuric acid ($H_2S_2O_8$), monoperoxysulfuric acid ($H_2SO_5$) and mixtures thereof.

8. The method of claim 7 wherein said chlorate ions are provided by sodium chlorate.

9. The method of claim 2 wherein said persulfate in said aqueous acid reaction medium is formed by mixing at least part of alkali metal sulfate by-product from the chlorine dioxide producing method with a sulfuric acid feed for said aqueous acid reaction medium, electrolyzing the resulting mixture to form an aqueous mixture containing persulfate, and feeding said aqueous mixture to the aqueous acid reaction medium.

10. The method of claim 9 which is carried out in a cation exchange membrane divided electrochemical cell and wherein migration of alkali metal ions is permitted from an anode compartment to a cathode compartment of the cell and an alkali metal hydroxide is formed in the cathode compartment.

11. The method of claim 10 wherein said chlorate ions are provided by sodium chlorate.

12. The method of claim 2 wherein said persulfate in said aqueous acid reaction medium is formed by forming an aqueous solution of at least part of the alkali metal sulfate by-product from the chlorine dioxide producing method, electrolyzing the aqueous solution to form a persulfate-containing solution, and feeding the persulfate-containing solution to the aqueous acid reaction medium.

13. The method of claim 12 which is carried out in a cation exchange membrane divided electrochemical cell and wherein migration of alkali metal ions is permitted from an anode compartment to a cathode compartment of the cell and an alkali metal hydroxide is formed in the cathode compartment.

14. The method of claim 13 wherein said chlorate ions are provided by sodium chlorate.

15. The method of claim 14 wherein said persulfate-containing solution contains persulfuric acid in a form selected from the group consisting of peroxydisulfuric acid ($H_2S_2O_8$), monoperoxysulfuric acid ($H_2SO_5$) and mixtures thereof.

16. The method of claim 2 wherein said electrolysis of said aqueous medium to form the persulfate is effected in a divided electrochemical cell having an anode compartment, a central compartment and a cathode compartment, said anode and central compartments and said central and cathode compartments being separated from each other by a first and second cation exchange membrane respectively, at least part of a sulfuric acid feedstock for said aqueous acid reaction medium is subjected to electrochemical oxidation in said anode compartment and hydrogen ions are transferred across the first cation exchange membrane to the central compartment, an aqueous solution of at least part of alkali metal sulfate by-product from the chlorine dioxide producing method is fed to a central compartment and alkali metal ions are transferred from the central compartment to the cathode compartment, an alkali metal hydroxide is formed in the cathode compartment, and acidic media from the anode compartment and/or central compartment are fed to the aqueous reaction medium.

17. The method of claim 16 wherein said chlorate ions are provided by sodium chlorate.

18. The method of claim 1 which is effected in the absence of a continuous feed of sulfuric acid to the aqueous acid reaction medium and of any additional reducing agent for the generation of chlorine dioxide from sodium chlorate.

19. The method of claim 1 wherein said aqueous acid reaction medium has a total acid normality of about 2 to about 11N.

20. The method of claim 19 wherein said aqueous acid reaction medium is maintained at its boiling point while a subatmospheric pressure is applied to a reaction zone in which the aqueous acid reaction medium is located and by-product alkali metal sulfate is precipitated from the reaction medium once the by-product reaches saturation after startup.

21. The method of claim 20 which is carried out at a pressure of about 90 to about 400 mmHg.

22. The method of claim 19 wherein said aqueous medium is maintained at substantially atmospheric pressure.

23. The method of claim 1 wherein a chlorine dioxide generation rate enhancing catalyst is present in said aqueous acid reaction medium.

24. The method of claim 1 wherein said persulfate in said aqueous acid reaction medium is provided by subjecting an aqueous solution of sodium sulfate provided by a source external to the chlorine dioxide generating process to electrolysis and forwarding the persulfate-containing solution so formed to the aqueous acid reaction medium.

* * * * *